United States Patent
Mitchell

(10) Patent No.: US 7,193,204 B2
(45) Date of Patent: Mar. 20, 2007

(54) MULTI-TRACK OPTICAL ENCODER EMPLOYING BEAM DIVIDER

(75) Inventor: Donald K. Mitchell, Wayland, MA (US)

(73) Assignee: GSI Group Corporation, Billerica, MA (US)

( * ) Notice: Subject to any disclaimer, the term of this patent is extended or adjusted under 35 U.S.C. 154(b) by 257 days.

(21) Appl. No.: 10/614,535

(22) Filed: Jul. 7, 2003

(65) Prior Publication Data

US 2004/0007664 A1 Jan. 15, 2004

Related U.S. Application Data

(60) Provisional application No. 60/394,387, filed on Jul. 8, 2002.

(51) Int. Cl.
*G01D 5/34* (2006.01)
*G01D 5/36* (2006.01)
*G01B 11/14* (2006.01)

(52) U.S. Cl. .................. 250/231.13; 250/231.14; 250/237 R; 356/616

(58) Field of Classification Search .......... 250/231.13, 250/231.14, 237 R, 237 G, 231.3, 231.4, 250/231.15, 231.16, 231.17, 231.18; 356/616, 356/617; 341/11, 13, 31; 359/227, 559
See application file for complete search history.

(56) References Cited

U.S. PATENT DOCUMENTS

| | | | |
|---|---|---|---|
| 5,214,280 A | 5/1993 | Rieder et al. ............ 250/237 G |
| 5,483,377 A * | 1/1996 | Kaneda et al. ............... 359/566 |
| 5,559,600 A | 9/1996 | Mitchell ...................... 318/356 |
| 5,569,913 A * | 10/1996 | Ishizuka et al. ......... 250/237 G |
| 5,646,730 A | 7/1997 | Mitchell et al. ............. 356/356 |
| 5,671,052 A | 9/1997 | Kawakubo et al. ......... 357/373 |
| 5,909,283 A | 6/1999 | Eselun ........................ 356/356 |
| 5,991,249 A * | 11/1999 | Lee .......................... 369/44.42 |
| 5,995,229 A | 11/1999 | Omi ............................ 356/374 |
| 6,366,047 B1 | 4/2002 | Horwitz et al. ............. 318/602 |
| 6,713,756 B2 | 3/2004 | Yamamoto et al. ..... 250/231.13 |
| 2003/0010906 A1* | 1/2003 | Lee ......................... 250/231.13 |
| 2003/0047674 A1* | 3/2003 | Thornburn et al. ..... 250/231.13 |

* cited by examiner

Primary Examiner—Georgia Epps
Assistant Examiner—Don Williams
(74) Attorney, Agent, or Firm—BainWoodHuang

(57) ABSTRACT

An optical encoder includes a sensor head, an encoder scale, and an optical wavefront dividing element. The sensor head includes a substrate, a light source, a first optical detector, and a second optical detector. The light source, the first optical detector, and the second optical detector are disposed on the substrate. The scale includes a first track and a second track. The optical wavefront dividing element is disposed between the sensor head and the scale. A light beam emitted by the light source is divided into a first beam and a second beam by the wavefront dividing element. The first beam is incident on the first track and the second beam is incident on the second track. Light from the first beam diffracted by the first track is incident on the first optical detector. Light from the second beam diffracted by the second track is incident on the second optical detector.

21 Claims, 5 Drawing Sheets

MULTI-TRACK OPTICAL ENCODER EMPLOYING BEAM DIVIDER

CROSS REFERENCE TO RELATED APPLICATIONS

This application claims priority under 35 U.S.C. §119(e) of U.S. Provisional Patent Application No. 60/394,387 filed Jul. 8, 2002, the disclosure of which is hereby incorporated by reference herein.

STATEMENT REGARDING FEDERALLY SPONSORED RESEARCH OR DEVELOPMENT

Not Applicable

BACKGROUND OF THE INVENTION

The present invention relates to diffractive optical encoders, and more specifically to optical encoders employing multiple tracks such as a position sensing track and a separate index mark track.

Diffractive optical encoders are well known in the field of position sensing systems. A recent trend has been to develop diffraction based encoders of reduced size. Generally, such reduced size encoders are characterized by their use of a solid-state source of quasi-monochromatic (or nearly monochromatic) illumination, one or more binary gratings on a scale, one or more detecting elements, and a reduced number of additional optical components.

Recently developed encoders have incorporated vertical cavity surface emitting laser (VCSEL) light sources because of their convenient optical properties. Unlike the more traditional diode lasers, VCSELs emit light from a circular aperture on the top surface. This can provide for a nearly circular beam that can be easily pointed toward the scale without the need for additional optical elements. When included in a so-called Talbot encoder, the VCSEL helps create a small, low power, and easy-to-assemble package.

It has been known to employ multiple grating tracks on the scale of an optical encoder. For example, it has been known to include an index, or reference, mark track on the scale in addition to a position scale. An absolute diffractive encoder that uses three or more grating tracks on a single scale is also known.

While it is desirable to use a VCSEL in multi-track encoders, the applicants have discovered that the relatively small angle of the cone of light emitted by available VCSELs can present problems. Simply stated, over the dimensions of interest the VCSEL beam does not spread out enough to cover all the tracks. In some encoders this problem has been solved by increasing the distance between the VCSEL and the scale. However, this solution runs contrary to the goal of creating a compact encoder system.

In addition, when the VCSEL's beam is spread out over a large enough circular region to cover all tracks, only a small fraction of the VCSEL's light is actually used by the encoder. The maximum light power for illuminating the main signal track is effectively reduced by a factor equal to. the number of tracks. Additional power is lost in light directed into non-functional areas of the scale and the detector, for example into the gap between scale tracks. These factors may reduce the light power for the main signal track to less than half that of comparable encoders employing edge-emitting lasers, resulting in a correspondingly lower signal-to-noise ratio. Furthermore, unlike edge emitting lasers, VCSELs have inherent power limitations that prevent compensating for the reduced light power by driving the VCSEL with higher current.

Thus, there is a need for an improved method of illuminating a multi-track diffractive scale without sacrificing the benefits of small size generally associated with VCSEL-based encoders.

BRIEF SUMMARY OF THE INVENTION

In accordance with the present invention, a multi-track optical encoder is disclosed that achieves a small size and good performance even when a narrow-beam light source such as a VCSEL is used.

A disclosed diffractive optical encoder utilizes the Talbot effect for position sensing and incorporates a line image sensor for index mark detection. The encoder includes a sensor head incorporating a diffractive optical wavefront divider to divide the VCSEL illumination into two distinct beams: one for the position sensing track on the encoder scale and one for the index mark track on the scale. The VCSEL source is located symmetrically between one multi-element detector array, typically optimized for sensing the position-indicating fringes, and a second multi-element array, typically optimized for sensing the index mark.

Through the use of multiple beams each directed to specific tracks rather than a single wide beam for all tracks, the encoder can advantageously provide for (a) reduced size, (b) illumination of grating tracks with minimal loss of optical power, (c) beam pointing without the need for tilting of the source/detector substrate relative to the scale, (d) improved balance between the illumination levels on the multiple tracks over a wide range of alignment tolerances, the balanced illumination leading to balanced signals from the detectors, and (e) reduction of the number and complexity of the components used to assemble the sensor head, thereby reducing cost.

Other aspects, features, and advantages of the present invention will be apparent from the Detailed Description of the Invention that follows.

BRIEF DESCRIPTION OF THE SEVERAL VIEWS OF THE DRAWING

The invention will be more fully understood by reference to the following Detailed Description of the Invention in conjunction with the Drawing, of which:

FIG. 4b illustrates certain parameters as they apply to FIG. 4a;

DETAILED DESCRIPTION OF THE INVENTION

Figure 1:
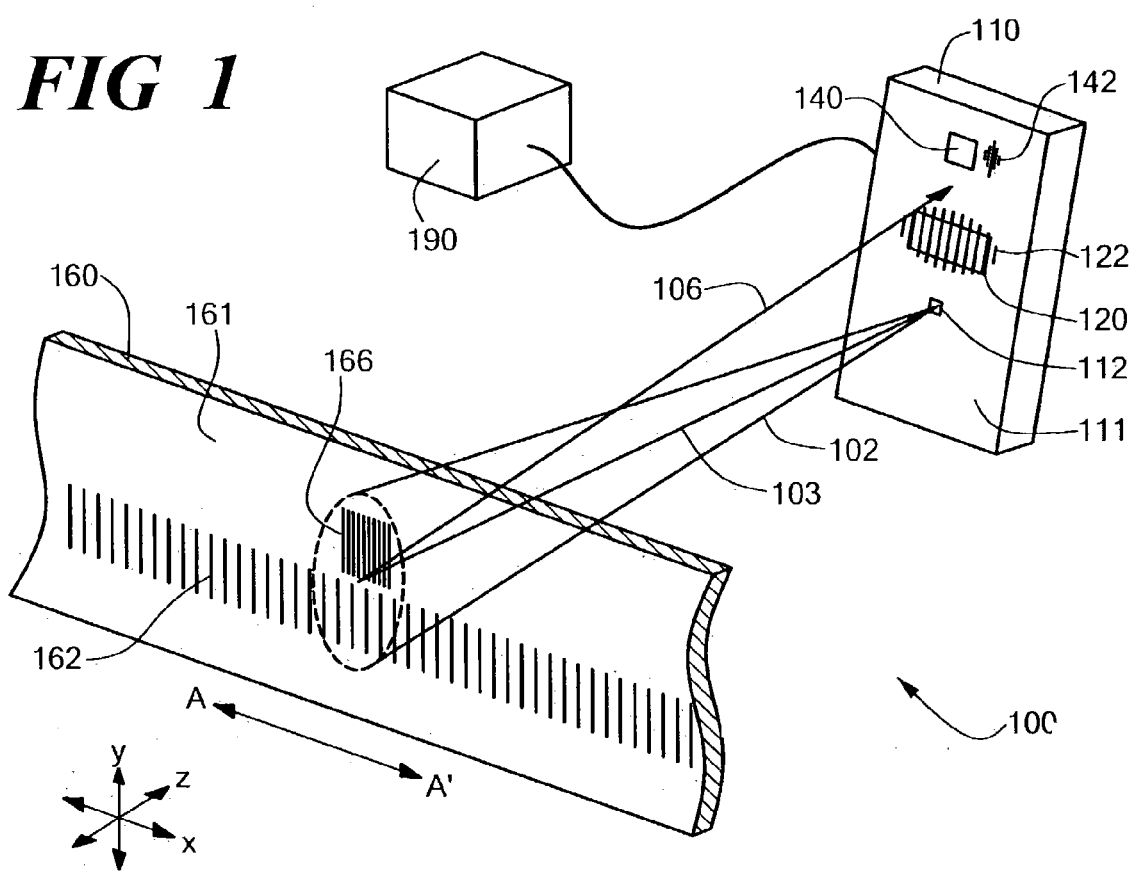
FIG. 1 is a schematic depiction of a first VCSEL-based encoder illustrating the need for large separation to illuminate both tracks in a two-track encoder.

FIG. 1 shows a perspective view of a multi-track, Talbot, diffractive optical encoder 100. As shown, encoder 100 includes three basic components: an opto-electronic assembly or sensor head 110, a scale 160, and a signal processor 190.

The sensor head 110 includes a light source 112, a primary detector array 120, and an index, or reference point, detector 140. As shown, the source 112 and the detectors 120, 140 are all mounted on a common substrate 111. Primary detector array 120 and index detector 140 are each preferably implemented on a single piece of silicon. The scale 160 includes a substrate 161 upon which is formed a diffractive grating 162 and at least one diffractive optical element (DOE) 166. The scale 160 is generally disposed opposite the sensor head 110 at a fixed distance. In operation, the scale 160 and sensor head 110 move relative to one another in the direction indicated by double headed arrow A–A'. For purposes of this description, the direction indicated by double headed arrow A–A' is designated the x-axis; the axis perpendicular to the plane of the scale is designated the z-axis; and the remaining orthogonal direction is designated the y-axis. In operation, the encoder 100 monitors the x-axis movement of the scale 160 relative to the sensor head 110 and generates a signal representative of the position of scale 160 relative to sensor head 110 The optical patterns-that fall upon detectors 120 and 140 are converted to electrical signals and transmitted to the processor 190, which processes the signals to derive measurements of the relative displacement of scale 160 and the passage of the index mark 166 respectively.

The light source 112 emits an expanding, or diverging, cone of light 102. For clarity in the figures the various cones of light may alternatively be illustrated by full cones or by central rays only. Source 112 is preferably a source of quasi-monochromatic light (or nearly monochromatic light) such as a vertical cavity surface emitting laser (VCSEL). The sensor head 110 and scale 160 are preferably disposed so that when the light cone 102 reaches scale 160, the light cone 102 is wide enough to be, incident on a portion of the grating 162 as well as on DOE 166. For a transparent substrate such as substrate 161, a portion of the light in cone 102 propagates through and is diffracted by the scale 160, and this light preferably does not return toward the sensor head 110. Additionally, a portion of the light in cone 102 is reflected and diffracted back toward sensor head 110. The sensor head 110 and the scale 160 are preferably configured so that (1) light diffracted backwards from grating 162 toward sensor head 110 is incident primarily on detector array 120 as a fringe pattern 122 and (2) light diffracted backwards from the DOE 166 toward sensor head 110 is incident primarily on the index detector 140 as a line image 142.

The grating 162 diffracts light from the cone 102 into multiple partial cones of light (not illustrated) that are directed toward sensor head 110. These partial cones optically interfere with one another and generate complex fringe-like patterns in the space between the scale 160 and the sensor head 110. These complex patterns become high contrast fringes at certain unique planes, called Talbot imaging planes, in the space between scale 160 and sensor head 110. Preferably, primary detector array 120 is positioned in one of these Talbot imaging planes so as to be illuminated with high contrast fringe pattern 122.

Similarly, the separation between the sensor head 110 and the scale 160 is large enough to allow the cone of light 102 to also illuminate the region of the scale 160 containing DOE 166. Although the illustrated encoder 100 includes one grating 162 and one DOE 166, alternative encoders may include scales that incorporate multiple gratings and/or DOE's. The line image 142 formed in the plane of sensor head 110 is an index mark that moves across index detector 140 as the DOE 166 moves through the cone 102. When the line image 142 is centered on the index detector 140, the signal processor 190 indicates that the scale 160 is at its index position.

Figure 2:
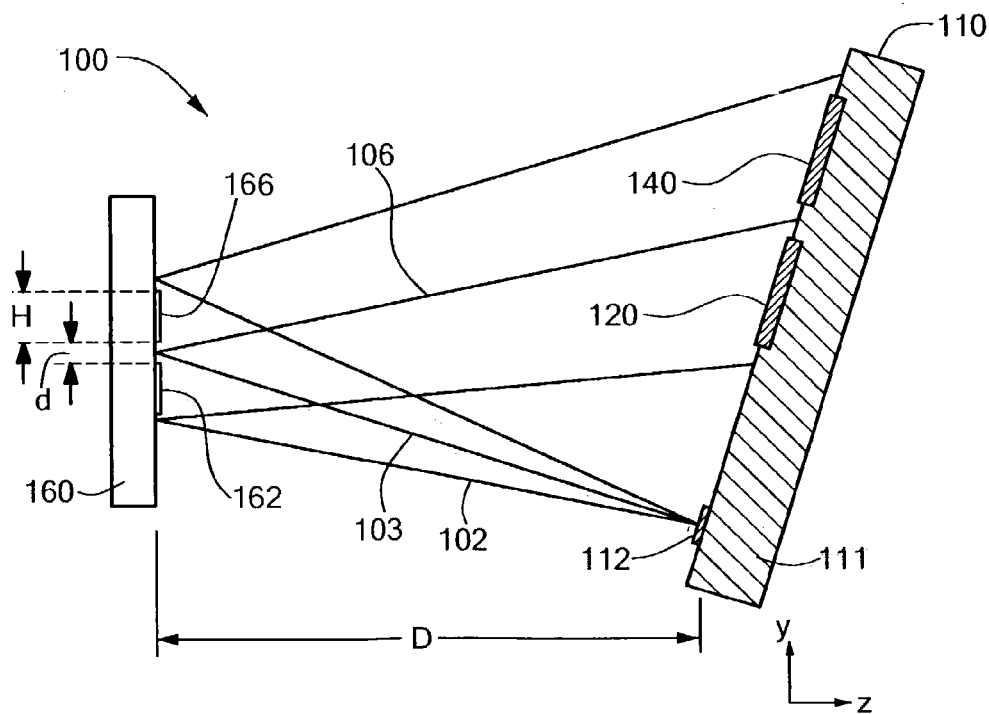
FIG. 2 is a schematic side view of the encoder shown in FIG. 1.

FIG. 2 is a side view of the encoder 100. An intentional alignment tilt about the x-axis exists between the respective planes of the sensor head 110 and of the scale 160. This tilt is preferably included for three purposes. First, it causes the central ray 103 of cone 102 to be directed to a location on the scale 160 that is generally mid-way between the grating 162 and the DOE 166, providing substantially equal and generally most efficiently-used illumination to both scale features simultaneously. Second, the diffracted and reflected light from the scale 160 is directed toward detectors 120 and 140, as indicated by reflected central ray 106. Third, undesirable retro-reflected light that would return to the light source 112 in the absence of the tilt is eliminated.

Figure 3:
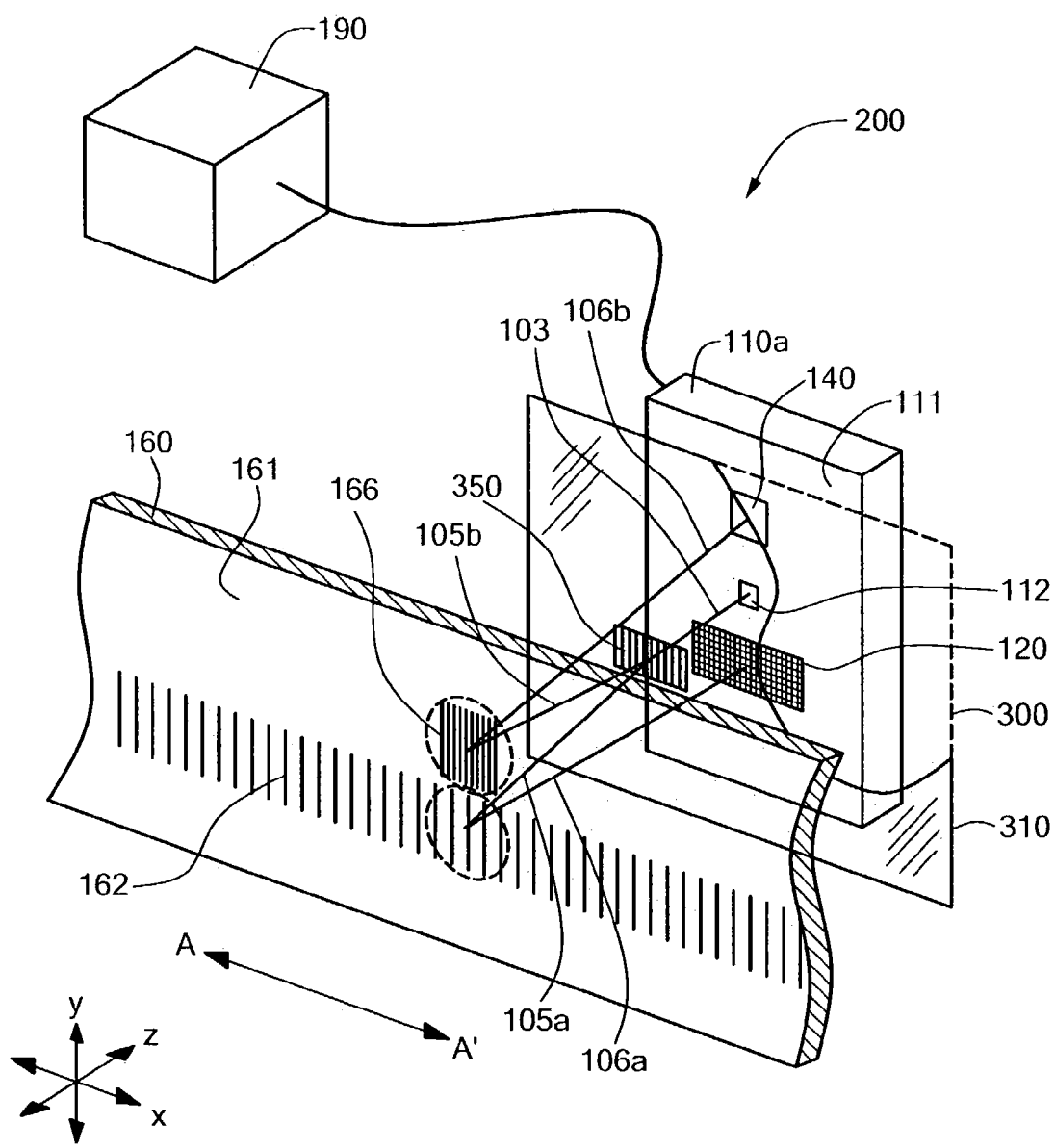
FIG. 3 shows a schematic depiction of a diffractive optical encoder constructed in accordance with the present invention.
Figure 4A:
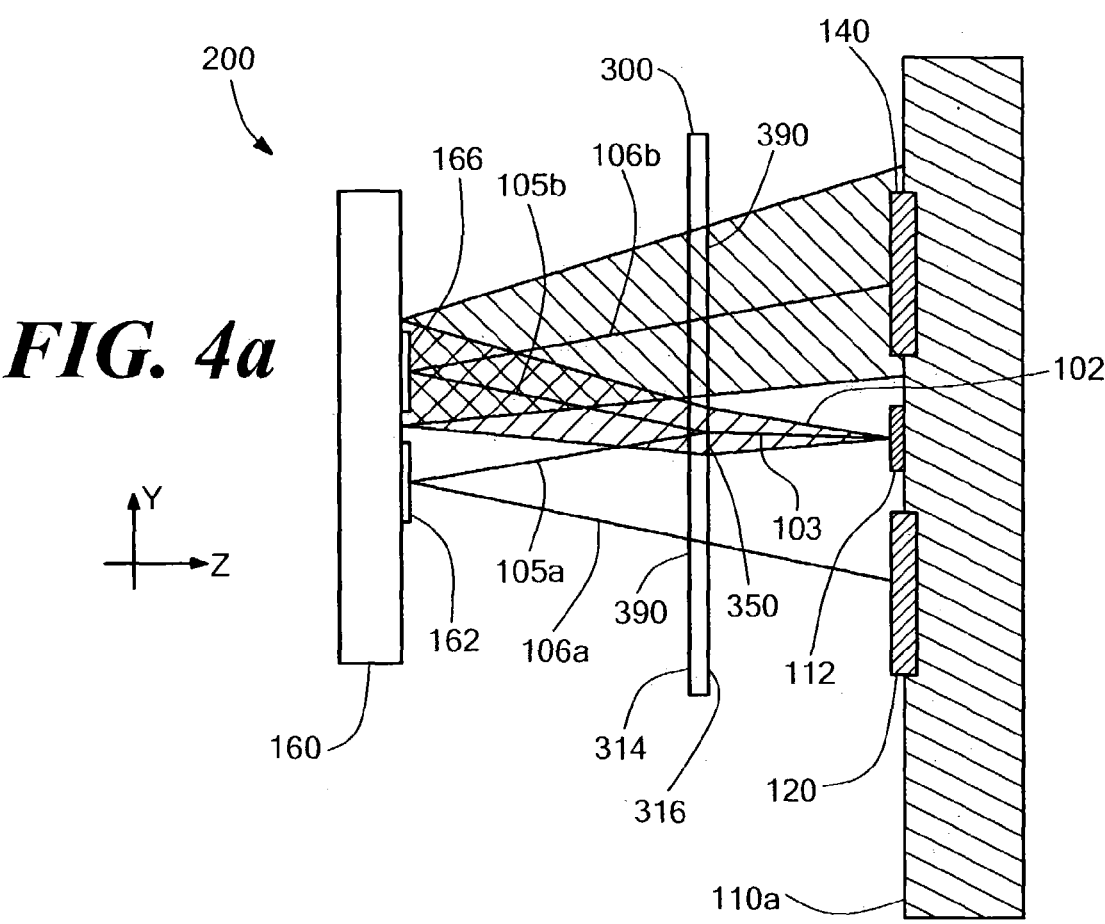
FIG. 4a is a side view of the encoder shown in FIG. 3.

FIG. 3 shows an embodiment of an encoder 200 constructed according to the present invention. FIG. 4a shows this encoder 200 in side view. The encoder 200 comprises a sensor head 110a, a scale 160, and a signal processor 190. The sensor head 110a comprises a quasi-monochromatic light source 112 (such as the above-mentioned VCSEL), two or more detectors 120 and 140, and a beam divider 300. Light from the source 112 emerges as a cone propagating substantially perpendicular to the plane of the sensor head substrate 111, as indicated by ray segment 103. As the light propagates toward scale 160, it passes through a wavefront dividing element 350 formed on a transparent substrate 310 of the beam divider 300. The wavefront dividing element 350 transforms the incident beam 103 from the source 112 into two or more beams propagating in different directions. For clarity, each beam is represented in the Figures by corresponding central rays 105a and 105b, although it should be understood that each beam is actually an expanding cone of light. For ease of description, the term "ray" and "beam" are used interchangeably herein. In one embodiment, the beams created by the wavefront dividing element 350 have substantially equal intensity, but beams of different intensities may be employed in alternative embodiments.

The beams 105a and 105b impinge on their respective tracks on the scale 160, and each track reflects and diffracts the incident beam according to well known optical diffraction principles. The grating 162 reflects the beam 105a substantially in the direction of the primary detector array 120, as indicated by ray 106a. The grating 162 diffracts the beam 105a into multiple overlapping, replicated beams (not illustrated), and the replicated beams form complex, fringe-like patterns in the space between grating 162 and detector 120. As described above, it is possible to select the separation between the grating 162 and the detector 120 such that high contrast fringes are formed on detector 120.

Similarly, the DOE 166 reflects and diffracts the beam represented by ray 105b substantially in the direction of the index detector 140, as indicated by ray 106b. The DOE 166 forms a line-image of light in the plane of index detector 140, the line image moving in tandem with the scale 160. When the line image is centered on the index detector 140, the signal processor 190 indicates that the scale 160 is in its index location. It will be appreciated that the number of tracks on the scale 160 is limited to two for purposes of the present description. In general, there may be more than two tracks on the scale, with each track generally performing a different function in the overall position detecting scheme. In general, when T tracks are used (where T is an integer), the beam divider generates at least T beams such that one beam is directed toward each track.

FIG. 4a is a side view of the encoder 200 that further illustrates the ray paths. Following the path of the light as it leaves the source 112, the expanding cone of light 102 reaches wavefront dividing element 350 and is divided into two cones. One cone is directed in the positive y-direction toward the DOE 166, and one is directed in the negative y-direction toward the grating 162. The angles by which these cones are deviated by wavefront dividing element 350 as well as the other physical parameters of the sensor head and scale are calculated as described below. Once the cones have reached the scale 160, they are reflected back toward the sensor head 110a, passing through wavefront windows 390 on the beam divider 300 before reaching their respective detectors (primary detector 120 and index detector 140).

Figure 5:
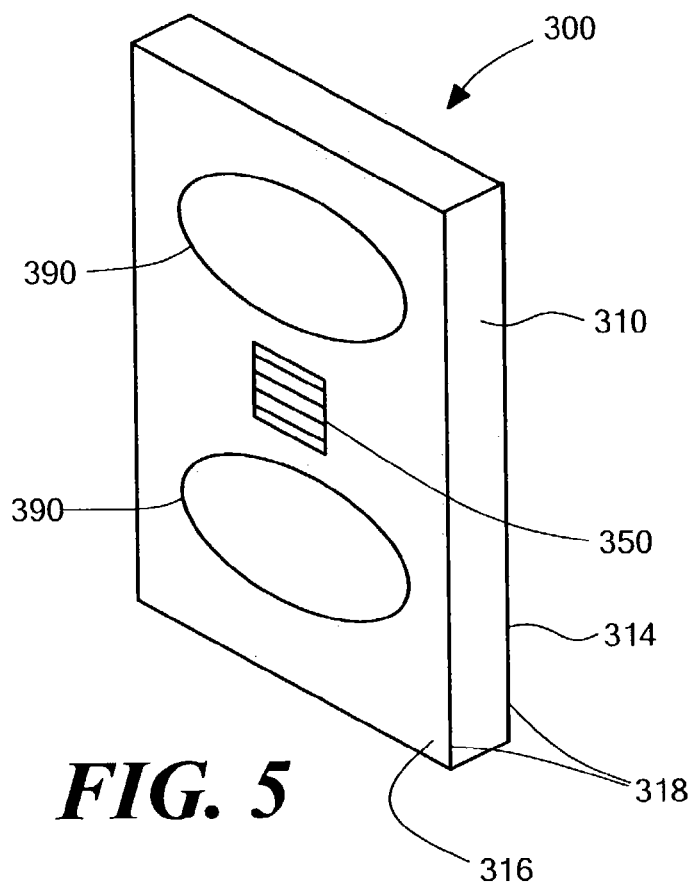
FIG. 5 illustrates a diffractive optical beam divider used in the encoder of FIGS. 3–4.

As shown in FIGS. 4a and 5, the beam divider 300 comprises transparent substrate 310 having a front surface 314 and a back surface 316 on which the wavefront dividing element 350 is formed. The beam divider 300 is preferably mounted with the rear surface 316 facing the source 112 perpendicular to the z-axis, and is preferably located such that the ray segment 103 impinges on the optical center of wavefront dividing element 350. Optionally, the beam divider 300 may be tilted about the x- or y-axis. Tilt about the y-axis directs residual light retro-reflected from the wavefront dividing element 350 away from the VCSEL source 112 and the detectors 120 and 140. The beam divider 300 is preferably mounted with its front surface 314 away from source 112, although the reverse orientation is an acceptable alternative.

The beam divider 300 includes the wavefront dividing element 350 and one or more wavefront windows 390. The substrate 310 is made from an optical quality transparent material, preferably a glass or glass-like material with good thermal properties (e.g., with a relatively low coefficient of thermal expansion). Optical quality plastics may also be used, typically for applications in which the thermal environment is controlled within relatively narrow bounds. Preferably, the substrate 310 is large enough to span all of the active optical elements on the detector substrate 111, so that beam 102 is incident on the wavefront dividing element 350 and the beams 106a and 106b are incident on the windows 390. Preferably, both the front surface 314 and the back surface 316 are coated with an anti-reflection coating 318. However, for greater efficiency it may be desirable to omit such coating from the rear surface 316 on which the element 350 is formed. Preferably, the wavefront windows 390 are optically flat, as is the entire clear aperture of the back surface 316.

In one embodiment, the beam divider 300 is rigidly mounted to the substrate 111 such that the sensor head 110a includes the beam divider 300. For example, the beam divider 300 and the substrate 111 may be packaged into a single monolithic construction such as a box shape with the beam divider 300 forming the top of the box, the substrate 111 forming the bottom of the box, and vertical walls of the box holding the beam divider 300 fixed relative to the substrate 111. However, it will be appreciated that the beam divider 300 need not be mounted directly to the substrate 111 and that the beam divider 300 and the remaining elements of the sensor head 110a may be separate components. Also, in some embodiments the windows 390 may in effect be eliminated by constructing the beam divider 300 such that beams reflected and diffracted from the scale (e.g., beams 106a and/or 106b as shown in FIG. 4a) are not incident on any part of beam divider 300.

Figure 6:
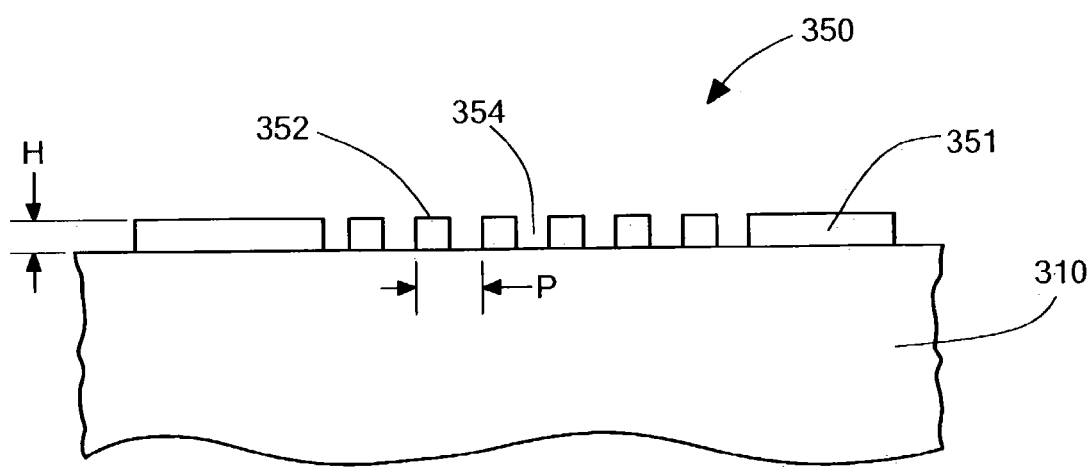
FIG. 6–8 show three alternative grating profiles that can be employed in a wavefront dividing element disposed on the optical beam divider of FIG. 5.

The wavefront dividing element 350 performs three major functions. First, it divides the single incoming cone 102 into multiple outgoing cones using a diffractive optical element (DOE) wavefront dividing element 350. Design principles and fabrication methods for DOE's are well known, and the selection of the preferred form of the DOE is primarily determined by manufacturing cost considerations. For low-cost applications, the preferred DOE profile may be a square wave as illustrated in FIG. 6. Such a DOE may be created by first coating the substrate 310 with a layer of optically transparent material 351 with an index of refraction n different from that of air. Typically, dielectric materials are used. A suitable material may be indium tin oxide (ITO), although the relatively high index of refraction (~2) of this material may cause undesirable back reflections. It may be preferable to use a dielectric material with a refractive index closer to the refractive index of the substrate 310 (~1.5). The thickness H of layer 351 is selected to introduce a substantially half-wave delay in the light passing through it. That is, $$H = \frac{\lambda}{2(n-1)} \qquad (1)$$

where $\lambda$ is the wavelength of the source illumination, and where n is the index of refraction of the material 351. Well known photolithographic techniques are then employed to pattern the layer 351 with the desired wavefront dividing pattern. In the example of FIG. 6, a square-wave periodic structure is created by selective removal of the material 351 to form alternating regions 352 and 354, the periodicity being along the y-axis. Substantially all of the material of layer 351 in regions 354 is removed, such that each of the removed regions 354 is substantially square edged and has a width that is about half of the repeat period P. Each groove 354 extends continuously in the x-direction for a distance comparable to the diameter of the cone 102 in the plane of the beam divider 300.

The square-wave diffraction grating formed by the regions 352 and 354 exhibits optical behavior which is well known in the art. Specifically, a square-wave grating that introduces a half-wave of phase delay is known to diffract incoming beams of light into a plethora of diffracted orders, the angular direction of each order being $$\Theta_M = M\lambda/P, \qquad (2)$$

where M is the order number and P is the period of the wavefront dividing element 350. For a substantially square-wave, half-wave delay grating, the even orders have substantially zero power.

Figure 7:
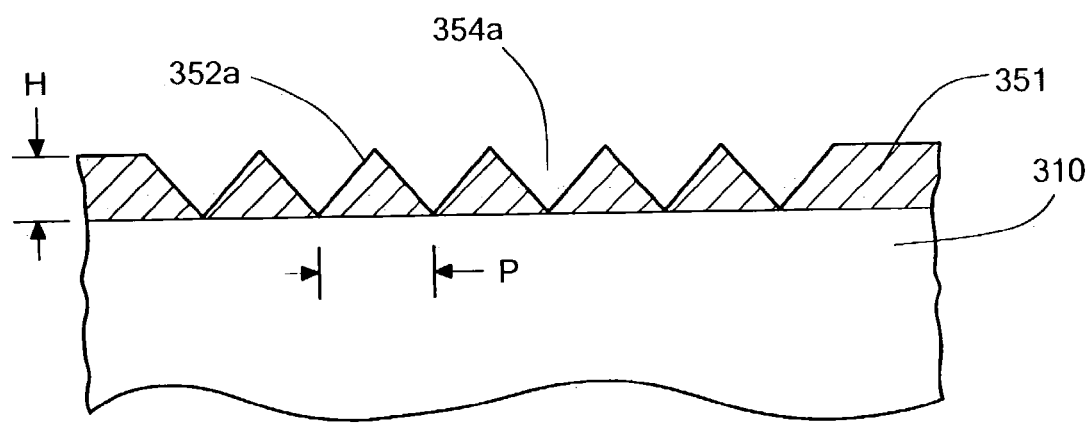
Figure 8:
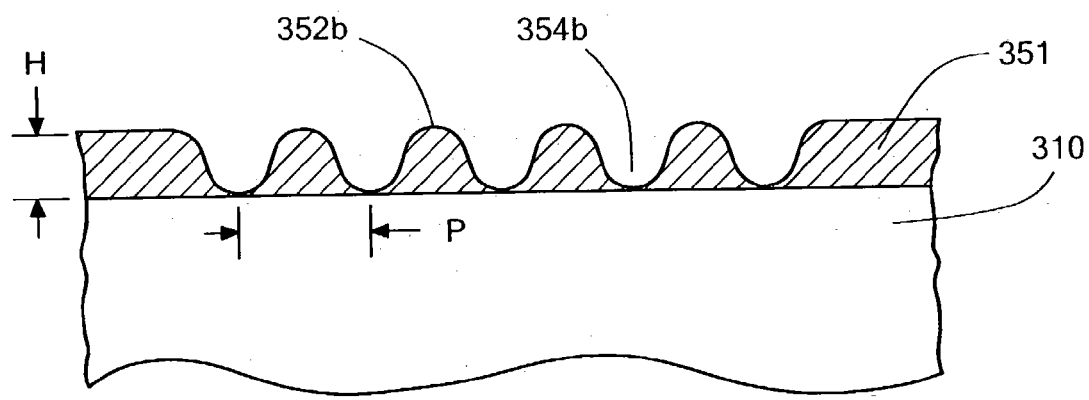

Although a square-wave grating such as shown in FIG. 6 has the benefit of relatively low cost due to the ease with which it can be manufactured, the presence of a large number of orders of diffracted light beams may be problematic in some applications. Alternative grating profiles, such as a triangle wave as shown in FIG. 7 and a sinusoid as shown in FIG. 8, perform substantially the same function of diffracting the incoming cone into at least two symmetric exiting cones while advantageously reducing the optical power appearing in higher diffracted orders. However, these alternative gratings are generally more difficult to fabricate because of the need to create a smooth and continuous surface profile rather than the simpler step-like profile.

Alternative techniques of making gratings like those of FIGS. 6–8 may employ surface molding rather than selective removal of material. Molding may be especially advantageous in obtaining smooth profiles such as the sinusoidal profile of FIG. 8.

Yet another alternative wavefront divider, suitable for high performance applications, can be constructed using so-called binary or diffractive optical elements. In this DOE, the continuous removal of material required for non-step profiles, such as a triangle function, is approximated by a staircase-like removal function, each step of which is a separate two-level photolithographic process. This DOE process can be extended to create phase grating structures with an arbitrary distribution of orders using well known analytic techniques. DOEs made to these specifications are commercially available from many vendors, for example, Corning Precision Lens, Inc. of Cincinnati, Ohio.

Figure 4B:
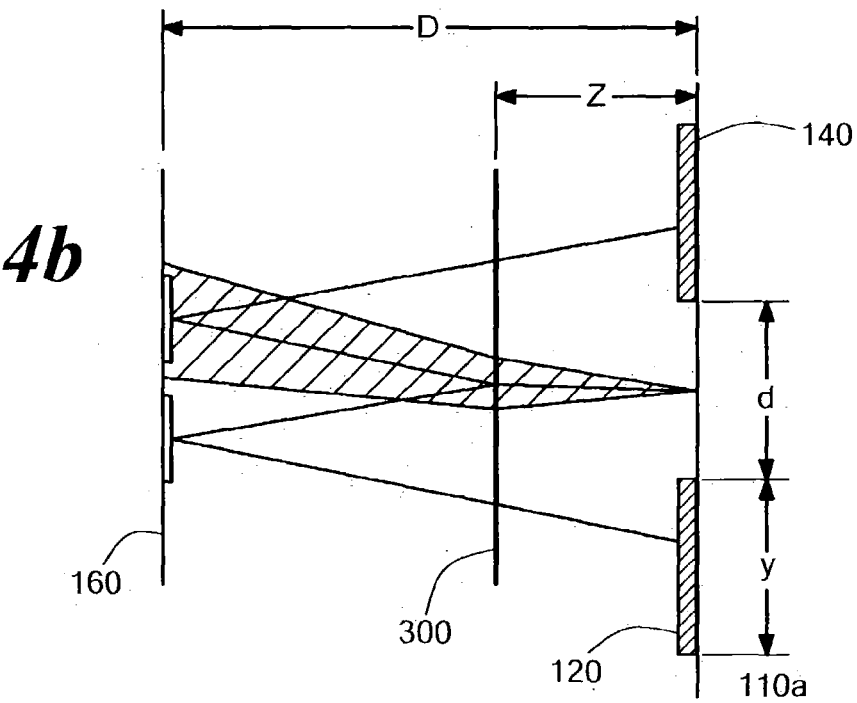

In addition to its function of dividing the cone 102 into two or more beams, the wavefront dividing element 350 also redirects the replicated cones toward respective regions on the scale 160 (i.e., cone 105a toward scale 162, and cone 105b toward DOE 166). Finally, in addition to causing the replicated cones to illuminate the appropriate regions of the scale, wavefront dividing element 350 also preferably imparts a desired beam tilt on the respective cones. Conveniently, all three desired functions can be accomplished by the single wavefront dividing element 350 and, in fact, the three functions are naturally linked. As revealed by Equation (2) above, a diffractive wavefront dividing element (a) creates multiple beams (replicates), (b) directs each of the replicated beams to the appropriate region on the scale, the redirection being determined by the product of the wavefront-divider-to-scale separation Δ and the tangent of the diffraction angle $\Theta_M$, and (c) imparts a tilt equal to the diffraction angle $\Theta_M$ to each of the respective cones. The separation Δ between the wavefront dividing element 350 and the scale 160, as well as the separation D between the scale 160 and the sensor head 110a, is illustrated in FIG. 4b.

Returning to FIGS. 3 and 4a, the cones of light represented by rays 105a, 105b reach scale 160 where they are diffracted and reflected by grating 162 and DOE 166. The reflected beams propagate back toward sensor head 110a as cones centered on rays 106a, 106b respectively. Typically these returning cones of light pass through the wavefront windows 390 of the beam divider 300 before reaching the detectors 120, 140 on the sensor head 110a. In the regions of the windows 390, the substrate 310 preferably operates as a plane parallel window with negligible optical effect on the cones.

In the illustrated encoder, the separation between the scale 160 and the sensor head 110a is determined by the spreading of cone of light 102 as it emerges from source 112. In the encoder of FIGS. 1 and 2, the separation must be big enough for the single cone 102 to illuminate both the primary grating 120 and the index grating 140 simultaneously, with a margin to allow for alignment tolerances. In the encoder of FIGS. 3 and 4, the separation D is preferably large enough to allow the cones of light to individually illuminate all active parts of the detector arrays, also with an extra margin to allow for alignment tilt tolerances. Using simple geometry, the separation D is given by $$D \geq \frac{Y/2}{2\tan\left(\frac{\Theta_L - T}{2}\right)}, \quad (3)$$

where:

Y is the height along the y-axis of the larger of the two detectors 120 and 140, the rays 106a and 106b are assumed to be aimed at the mid-points of the detectors 120 and 140 respectively, $\Theta_L$ is the divergence angle of the cone 102, typically taken to be the "Full Width Half Maximum" (FWHM) of a Gaussian beam, and T is a tilt angular tolerance.

In one embodiment, Y is 360 microns, $\Theta_L$ is 13 degrees, and T is 2 degrees, yielding a minimum separation D of 1700 microns. Preferably the separation D is larger than the minimum given by equation (3) above and is selected on the basis of the requirements of Talbot fringe generation. For the encoder 200 a desirable value for D may be about 4800 microns.

The period P of the wavefront dividing element 350 can be calculated as a function of the axial distance, Z, between the sensor head 110a and the beam divider 300 and the separation d of the two detectors 120 and 140. The basic geometrical relationship between these two parameters is:

$$\tan\left(\frac{\lambda}{P}\right) = \frac{Y+d}{2(2D-Z)} \quad (4)$$

Thus, if the wavefront dividing element 350 is to be placed half way between the scale and the sensor head, the required period can be derived by setting Z equal to D/2:

$$P = \frac{\lambda}{\text{Arctan}\left(\frac{Y+d}{5D}\right)} \approx 5\lambda D/(Y+d) \quad (5)$$

In one embodiment, Y may be 360 microns, the separation d between the detectors 1500 microns, and the sensor-to-scale distance D 4800 microns, so that P≅6.5 microns for a 850 nm VCSEL source 112.

While the encoder with beam splitter is described above as having a substrate 110, beam divider 300 and scale 160 all parallel to each other, alternative embodiments may employ a tilted configuration in which the scale 160 is not parallel to the substrate 110 and beam divider 300. In such an embodiment, the reflected beams 106a and 106b could both pass through the beam divider 300 on the same side of the wavefront dividing element 350.

It will be apparent to those skilled in the art that modifications to and variations of the disclosed methods and apparatus are possible without departing from the inventive concepts disclosed herein, and therefore the invention should not be viewed as limited except to the full scope and spirit of the appended claims.

What is claimed is:

1. An optical encoder including:
a sensor head including a substrate and beam divider, the beam divider including an optical wavefront dividing element, the substrate having a light source and first and second optical detectors disposed thereon;
an encoder scale including first and second tracks, the encoder scale being disposed opposite the sensor head with the beam divider disposed therebetween such that a light beam emitted by the light source is incident on the wavefront dividing element, the wavefront dividing element being operative to divide the incident beam into first and second beams being substantially incident on the first and second tracks of the encoder scale respectively, light from the first beam being reflected and diffracted by the first track to the first optical detector, and light from the second beam being reflected and diffracted by the second track to the second optical detector; and
a signal processor operative to interpret signals from the first and second detectors.

2. An optical encoder according to claim 1, wherein:
the light source comprises a quasi-monochromatic light source disposed on a planar surface of the substrate facing the encoder scale; and
the optical detectors are disposed on the surface of the substrate at respective locations defining respective optical paths between the optical detectors and respective tracks of the encoder scale.

3. An optical encoder according to claim 1, wherein the quasi-monochromatic light source comprises a vertical cavity surface emitting laser (VCSEL).

4. An optical encoder according to claim 1, wherein the quasi-monochromatic light source emits an expanding cone of light.

5. An optical encoder according to claim 1, wherein the optical detectors are disposed on opposite sides of the light source.

6. An optical encoder according to claim 1, wherein the substrate is a first substrate, and wherein the wavefront dividing element comprises a diffractive optical element (DOE) disposed on a second substrate.

7. An optical encoder according to claim 6, wherein the DOE comprises a layer of material having a thickness selected to introduce a substantially half-wave delay in light passing through the DOE.

8. An optical encoder according to claim 6, wherein the DOE comprises a grating having a square wave profile.

9. An optical encoder according to claim 6, wherein the DOE comprises a grating having a triangle wave profile.

10. An optical encoder according to claim 6, wherein the DOE comprises a grating having a-sine wave profile.

11. An optical encoder according to claim 6, wherein the second substrate further includes a plurality of windows, each window lying along a corresponding one of the optical paths between the tracks on the encoder scale and the detectors.

12. An optical encoder according to claim 6, wherein the second substrate comprises a substantially optically transparent material having a low coefficient of thermal expansion.

13. An optical encoder according to claim 6, wherein the second substrate is coated with optically transparent material having an index of refraction n different from that of air.

14. An optical encoder according to claim 13, wherein the optically transparent material comprises a dielectric material.

15. An optical encoder according to claim 14, wherein the dielectric material has a refractive index close to the refractive index of the second substrate.

16. An optical encoder according to claim 1, wherein the tracks of the encoder scale include (1) a first track having a diffractive optical element for forming a line image indicative of an index location of the scale, and (2) a second track having a diffraction grating for forming a diffraction pattern indicative of incremental position of the scale.

17. An optical encoder including:
a sensor head including a substrate having a light source and first and second optical detectors disposed thereon;
an encoder scale including first and second tracks; and
a wavefront dividing element disposed between the sensor head and the encoder scale, the wavefront dividing element being operative to divide an incident light beam emitted by the light source into first and second beams, the first beam being incident on the first track of the encoder scale, the second beam being incident on the second track of the encoder scale, light from the first beam being reflected and diffracted by the first track to the first optical detector, light from the second beam being reflected and diffracted by the second track to the second optical detector.

18. An encoder according to claim 17, wherein the wavefront dividing element is disposed on a substrate of the beam divider disposed between sensor head and the encoder scale.

19. An encoder according to claim 18, wherein the substrate of the beam divider is fixed relative to the substrate of the sensor head.

20. An encoder according to claim 18, wherein the substrate of the beam divider and the substrate of the sensor head are fixed into a single monolithic construction.

21. An optical encoder sensor head for use with a reflective multi-track encoder scale, comprising:
a quasi-monochromatic light source disposed on a surface of a planar substrate facing the encoder scale;
a plurality of optical detectors disposed on the surface of the substrate at respective locations defining respective optical paths between the optical detectors and respective tracks of the encoder scale; and
an optical wavefront dividing element disposed between the substrate and the encoder scale, the optical wavefront dividing element being operative to divide an incident light beam produced by the light source into a plurality of diffracted light beams, each diffracted light beam being directed toward a respective track of the encoder scale at a respective angle so as to be reflected from the respective track along the optical path to the respective detector, wherein the number of optical detectors is two, and wherein the wavefront dividing element has a periodic grating pattern with a period P satisfying the following relationship:

$$\tan\left(\frac{\lambda}{P}\right) = \frac{Y+d}{2(2D-Z)} \quad (4)$$

where $\lambda$ is the wavelength of the light source, Y is a height of a largest one of the optical detectors, d is a separation between the optical detectors, D is a separation between the planar substrate and the encoder scale, and Z is a separation between the planar substrate and the wavefront dividing element.

* * * * *